(12) United States Patent
Das et al.

(10) Patent No.: US 7,657,782 B2
(45) Date of Patent: Feb. 2, 2010

(54) CREATING AND MANAGING MULTIPLE VIRTUALIZED REMOTE MIRRORING SESSION CONSISTENCY GROUPS

(75) Inventors: Sanjoy Das, Palo Alto, CA (US); Sathees Babu Kodi, San Jose, CA (US); Michael Liang Tan, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/422,962

(22) Filed: Jun. 8, 2006

(65) Prior Publication Data

US 2008/0010496 A1 Jan. 10, 2008

(51) Int. Cl.
*G06F 11/00* (2006.01)
(52) U.S. Cl. .......................................... 714/6
(58) Field of Classification Search .............. 714/6
See application file for complete search history.

(56) References Cited

U.S. PATENT DOCUMENTS

| | | | |
|---|---|---|---|
| 5,504,894 A | | 4/1996 | Ferguson et al. |
| 5,630,132 A | * | 5/1997 | Allran et al. ............... 718/100 |
| 5,671,439 A | | 9/1997 | Klein et al. |
| 5,778,411 A | * | 7/1998 | DeMoss et al. ............... 711/4 |
| 6,035,306 A | * | 3/2000 | Lowenthal et al. .......... 707/200 |
| 6,393,481 B1 | * | 5/2002 | Deo et al. .................... 709/224 |
| 6,625,161 B1 | | 9/2003 | Su et al. |
| 6,757,778 B1 | * | 6/2004 | van Rietschote ............... 711/6 |
| 6,820,182 B1 | * | 11/2004 | Bauman et al. ............. 711/170 |
| 6,944,785 B2 | | 9/2005 | Gadir et al. |
| 2001/0034771 A1 | * | 10/2001 | Hutsch et al. ............... 709/217 |
| 2002/0087704 A1 | * | 7/2002 | Chesnais et al. ............. 709/228 |
| 2002/0188711 A1 | * | 12/2002 | Meyer et al. ................. 709/223 |
| 2003/0037278 A1 | | 2/2003 | Olarig |
| 2004/0006587 A1 | * | 1/2004 | McConnell et al. .......... 709/202 |
| 2004/0019824 A1 | * | 1/2004 | McCombs .................... 714/13 |
| 2004/0174823 A1 | | 9/2004 | Steele et al. |
| 2004/0236983 A1 | * | 11/2004 | Burton et al. ................... 714/6 |
| 2005/0050273 A1 | * | 3/2005 | Horn et al. ................... 711/114 |
| 2005/0162424 A1 | | 7/2005 | Imai et al. |
| 2005/0185621 A1 | | 8/2005 | Sivakumar et al. |

FOREIGN PATENT DOCUMENTS

| | | |
|---|---|---|
| JP | 08-228203 A | 9/1996 |
| WO | WO 01/22273 A1 | 3/2001 |

* cited by examiner

*Primary Examiner*—Scott T Baderman
*Assistant Examiner*—Yair Leibovich
(74) *Attorney, Agent, or Firm*—Francis Lammes; Stephen J. Walder, Jr.; Randall J. Bluestone

(57) ABSTRACT

A mechanism is provided for creating and managing multiple virtualized remote mirroring session consistency groups. The mechanism virtualizes a single physical session of a remote mirroring storage system so that a user is able to create and manage multiple virtual sessions as if they were storage volumes belonging to different physical sessions. With the mechanism of the illustrative embodiments, failover and failback operations may be performed with regard to a first set of virtual sessions while other virtual sessions continue uninterrupted. Thus, a user is provided with the flexibility to temporarily move, through a selective failover operation, selected application production workloads from production sites to recovery sites while other applications can run continuously at the production site. Later, those failed-over applications may failback to the production site and rejoin the physical session.

29 Claims, 6 Drawing Sheets

410 {
```
- <asyncpprc>
- <!--
This section of the file defines the sharks that will be used in this AsyncPPRC session.
The only _REQUIRED_ attributes are the wwnn and sequence attributes.
Possible Attributes:
wwnn -#REQUIRED -the World Wide Node Name
sequence -#REQUIRED -the sequence number of the shark
type - (Optional) -the machine type of the shark. Default = Unknown
model - (Optional) -the model of the shark. Default = Unknown
pom - (Optional) -the place of manufacture of the shark. Default = Unknown
-->
- <boxes>
- <ess wwnn="5005076304FFC015" sequence="AMZM1">
<lss num="0x014" ssid="65299" />
<lss num="0x013" ssid="65279" />
</ess>
- <ess wwnn="5005076303FFC7A9" sequence="AKZX1">
  <lss num="0x014" ssid="65289" />
<lss num="0x013" ssid="65279" />
</ess>
</boxes>
```
}

420 {
```
- <pprcpaths>
- <path source="AMZM1:0x013" target="AKZX1:0x013">
<said source="0003" target="0000" />
</path>
- <path source="AMZM1:0x014" target="AKZX1:0x014">
<said source="0002" target="0001" />
</path>
</pprcpaths>
```
}

430 {
```
- <!--
All interval units are seconds.
-->
 - <session id="120" cginterval="30" maxdraintime="240" maxcoordinterval="75">
<master lss="AMZM1:0x014" />
</session>
```
}

440 {
```
- <!--
each volume identifier in the relationship
tags below is formatted as follows:

"ess_alias:lss_num(hex):vol_num" (Single Volume)
"ess_alias:lss_num(hex):vol_numS-vol_numE" (Range of Volumes)
"ess_alias:lss_num(hex):**" (Entire LSS)

Where ess_alias is defined above in the ess definition, lss_num is the
number of the lss, and vol_num is the number of volume within the LSS
-->
 - <volumes>
<relationship avol="AMZM1:0x013:000-001" bvol="AKZX1:0x013:002-003"
cvol="AKZX1:0x013:004-005" />
<relationship avol="AMZM1:0x014:000-001" bvol="AKZX1:0x014:002-003"
cvol="AKZX1:0x014:004-005" />
</volumes>
</asyncpprc>
```
}

CREATING AND MANAGING MULTIPLE VIRTUALIZED REMOTE MIRRORING SESSION CONSISTENCY GROUPS

BACKGROUND

1. Technical Field

The present application relates generally to an improved data processing system and method. More specifically, the present application is directed to a system and method for creating and managing multiple virtualized remote mirroring session consistency groups.

2. Description of Related Art

With today's businesses being increasingly more dependent on computing and storage systems for the maintenance and use of business related information, disaster recovery is of considerable importance. Thus, many different disaster recovery mechanisms have been devised to help ensure the access ability of businesses and individuals to their data even in the event of a failure of their storage systems.

One such disaster recovery mechanism that has been developed is the Global Mirror™ disaster recovery solution available from International Business Machines, Inc. of Armonk, N.Y., which is available on IBM's enterprise storage devices including the DS8100, the DS8300, the DS6800, the ESS Model 800 and the ESS Model 750.

Global Mirror™ provides a long-distance remote copy solution across two sites using asynchronous technology. The Global Mirror™ solution provides the ability to mirror data between volume pairs of a storage unit over greater distances without affecting overall performance. Global Mirror™ is also designed to provide application consistent data at a recovery (or remote) site in case of a disaster at the local site. By creating a set of remote volumes every few seconds, the Global Mirror™ solution addresses the consistency problem that can be created when large databases and volumes span multiple storage units. With Global Mirror™, the data at the remote site is maintained to be a point-in-time consistent copy of the data at the local site.

Global Mirror™ is based on the existing copy services functions Global Copy™ and FlashCopy®. Global Mirror™ operations periodically invoke a point-in-time FlashCopy® operation at the recovery site, at regular intervals, without disrupting the I/O to the source volume, thus giving a continuously updating, nearly up-to-date, data backup. Then, by grouping many volumes into a session, which is managed by a master storage unit, one can copy multiple volumes to the recovery site simultaneously while maintaining point-in-time consistency across those volumes.

In the Global Mirror™ solution, the master storage unit controls the creation of consistency groups in a Global Mirror™ session. The master storage unit sends commands to subordinate storage units. A storage unit is allowed to be a master for only one Global Mirror™ session.

The subordinate storage unit receives commands from a master storage unit. The subordinate storage unit is identified when a Global Mirror™ session is started. The subordinate storage unit forms consistency groups and performs other Global Mirror™ processing. A subordinate storage unit can only be controlled by one master storage unit.

A session is a collection of volumes across multiple storage units that are managed together to create consistent copies of data. The session is identified with an ID that is unique across the enterprise. The ID identifies volumes that will participate in the Global Mirror™ consistency group. For disaster recovery, it is required that the volumes in a session that are necessary for recovery be consistent up to the time of failure. If data on these volumes is copied out of sequence, then the recovery procedures that use these volumes become useless.

A control path is established from the master storage unit to a subordinate storage unit when more than one storage unit participates in the Global Mirror™ session. A separate control path may be provided between each master storage unit and each of its corresponding subordinate storage units. The master storage unit communicates directly with its subordinate storage unit using the defined control path.

The automatic cycle in an active Global Mirror™ session works as follows to maintain data at a remote site to be a point-in-time consistent copy of data at the local site. First, consistency groups of volumes are created at the local site. Increments of consistent data are sent to the remote site and FlashCopy® operations are performed at the remote site. Global Copy operations are then resumed between the local and remote site to copy out of sync tracks. These steps are repeated according to defined time intervals.

Currently, the Global Mirror™ solution only allows one physical session to be running at a time per physical storage control unit, i.e. the control processor for the storage subsystem. This significantly reduces the business flexibility for businesses that may have multiple applications, sometimes with different service level agreements, on one storage control unit. That is, since only one physical session is allowed to run per physical storage control unit, if a scheduled failover or failback operation is desired by the user for a specific set of volumes, the failover or failback operation must be performed with regard to all of the storage volumes controlled by that physical storage control unit and thus, all of the applications that utilize the physical storage control unit.

Therefore, even though the failover or failback operation may be desired for the storage volumes for only one application, all of the storage volumes and applications must undergo the failover or failback operation. Thus, it would be beneficial to have a mechanism that allows individual storage volumes or individual sets of storage volumes associated with a single application to be the subject of a failover or failback operation within a physical session of a remote mirroring storage system, such as a Global Mirror™ based storage system.

SUMMARY

In one illustrative embodiment a method is provided for performing a remote mirroring operation between a production site system and a recovery site system. The illustrative embodiment establishes a physical session for a storage control unit associated with the production site system. In the illustrative embodiment, the physical session includes a plurality of storage volume groups. The illustrative embodiment establishes a virtual session, within the physical session, for each of the plurality of storage volume groups thereby forming a plurality of virtual sessions. The illustrative embodiment receives a request to mirror one or more virtual sessions in the plurality of virtual sessions. The illustrative embodiment spawns a thread for each virtual session in the plurality of virtual sessions. The illustrative embodiment assigns a unique session identifier to each thread. In the illustrative embodiment, the unique session identifier indicates either mirroring of the virtual session or not to mirror the virtual session. The illustrative embodiment selectively performs a remote mirroring operation, between the computing device and a second computing device, with respect to one or more of the storage volume groups in the plurality of storage volume groups based on whether the one or more storage volume groups has an associated virtual session with an associated thread that has an associated unique session identifier indicating the mirroring of the virtual session while other storage volume groups in the plurality of storage volume groups are not subjected to the remote mirroring operation based on whether the other storage volume groups has an associated virtual session with an associated thread that has an associated unique session identifier indicating not to mirror the virtual session. The illustrative embodiment updates a task instruction pointer (TIP) by each thread after completion of the corresponding thread's operations in the remote mirroring operation. In the illustrative embodiment, a thread that has the associated unique session identifier indicating the mirroring of the virtual session updates the TIP when the remote mirroring operation is complete. In the illustrative embodiment, the thread that has the associated unique session identifier indicating not to mirror the virtual session updates the TIP without performing any remote mirroring operation.

With the illustrative embodiments, while there is only one active physical session possible by design on each storage control unit, all of the volumes belonging to this physical session can be segregated into groups according to each individual application that the user wishes to control separately. In order to generate a virtual session group for each individual application, a session policy file that specifies the primary volumes, secondary volumes, FlashCopy® volumes, control path information, and session parameters for each virtual session group. Virtual sessions require a distinct control path relationship between source and target volumes, i.e. production site volumes and recovery site volumes, and the session parameters are the same among all sessions, i.e. the session identifier, consistency group interval, maximum consistency group drain time, maximum coordination timer, master server, etc.

The session policy file is then transformed into session data objects, each of which contains a connection object to a corresponding storage control unit, path connection objects, and volume objects which represent the physical storage devices associated with the storage control unit. A single unified supreme session object is provided which contains all sub-session objects. This supreme session object represents the real physical session for the storage control unit.

In order to coordinate multiple virtual sessions within the same single physical session, an operation thread group (OTG), a task instruction pointer (TIP), and unique session identifier (USI) are provided. For each remote mirroring operation, such as failover or failback, of a particular virtual session, all sessions will be operated on as threads belonging to one thread group, i.e. the OTG.

The task instruction pointer (TIP) is a global pointer for the OTG. The TIP is updated by individual threads after completion of their particular steps in an operation. In order to maintain the integrity and consistency of the physical session, it is important that no single thread be allowed to proceed until the overall TIP is successfully updated by each thread in the OTG. Alternatively, if an update of the TIP is not successful, every thread has to wait until such updating succeeds or corrective actions are executed to correct the failed steps and the particular failed step of the particular thread is re-executed successfully. If a thread operation calls for "skipping" certain steps based on their unique session identifier, that particular thread will update the TIP as "success" in order for the OTG to proceed to the next step.

Each thread in the OTG is assigned a unique session identifier (USI) which is based on user selection of sessions to go through the remote mirroring operation. The purpose of the USI is to allow each thread to carry out and respond differently on each step of the remote mirroring operation, e.g., determine whether or not to update or look for TIP to carry out their next steps.

Thus, the USI allows individual threads to perform separate actions on each step of a remote mirroring operation, such as a failover or failback operation. The TIP is used to provide consistency between the various threads of the OTG so that no thread is allowed to advance to a next action in a virtual session operation until all other threads in the OTG are ready to advance to their own next action in the virtual session operation. Thus, the TIP is responsible for maintaining the consistency of the physical session while the USI is responsible for allowing each thread to operate differently from other threads in the OTG. The combination of these two mechanisms and the policy objects, connection objects, and volume objects allows individual virtual sessions within a physical session of a storage control unit to undergo mirroring operations independently of other virtual sessions within the physical session. Hence, volumes associated with individual applications may undergo remote mirroring operations while other volumes associated with other individual applications may continue to operate without undergoing the remote mirroring operations.

In one illustrative embodiment, a computer program product comprising a computer useable medium having a computer readable program is provided. The computer readable program may, when executed on a computing device, causes the computing device to establish a physical session for a storage control unit associated with the computing device. The physical session may include a plurality of storage volume groups. The computer readable program may further cause the computing device to establish a virtual session, within the physical session, for each of the storage volume groups. The computer readable program may also cause the computing device to selectively perform a remote mirroring operation, between the computing device and a second computing device, with respect to one of the storage volume groups while other storage volume groups in the plurality of storage volume groups are not subjected to the remote mirroring operation. The remote mirroring operation may be, for example, one of a failover operation or a failback operation.

The remote mirroring operation may comprise a peer-to-peer remote copy operation of application data in a first storage volume associated with an application instance running on the computing device to a second storage volume of a storage system associated with the second computing device.

The computer readable program may further cause the computing device to receive a session policy file. The session policy file may comprise parameters identifying the physical session and the storage volume groups. The computer readable program may also cause the computing device to generate virtual session objects for each of the storage volume groups to thereby establish a virtual session for each of the storage volume groups. The virtual session objects may comprise a connection object for connecting to a particular storage control unit, a path connection object generated based on the control path information for the volume groups specified in the session policy file, and a volume object for each of the volumes that are part of the virtual session as specified in the session policy file.

The computer readable program may further cause the computing device to generate a physical session object based on the session policy file. The physical session object may comprise the virtual session objects, an operation thread group (OTG) and a task instruction pointer (TIP). The OTG may be comprised of a plurality of threads, one thread for each virtual session object and a master thread for the physical session object. Each thread may have a unique session identifier for differentiating between the virtual sessions and the physical session.

The computer readable program may cause the computing device to selectively perform a remote mirroring operation by executing operations of the remote mirroring operation using the plurality of threads in the OTG and coordinating execution of operations of the remote mirroring operation using the unique session identifiers of the threads in the plurality of threads such that the one storage volume group performs the remote mirroring operation while other storage volume groups do not perform the remote mirroring operation. The computer readable program may further causes the computing device to update the TIP by individual threads of the OTG after completion of the corresponding thread's operations in the remote mirroring operation. The computer readable program may further cause the computing device to prevent continuation of execution of threads in the OTG to a next operation until all threads in the OTG have updated the TIP to indicate successful completion of their current operation.

The remote mirroring operation may be a failover operation. As part of this failover operation, a physical session thread in the plurality of threads of the OTG may pause the physical session and a first virtual session thread in the plurality of threads of the OTG may initiate a failover from a storage volume group associated with the first virtual session thread to a storage volume group associated with the second computing device. The physical session thread may remove the storage volume group associated with the first virtual session thread from the physical session object and may resume operation of other storage volume groups of other virtual sessions associated with the physical session.

The computing device and second computing device may be topologically remotely located from one another. The computing device and second computing device may also be geographically remotely located from one another.

In a further illustrative embodiment, a data processing system for performing a remote mirroring operation between the data processing system and another data processing system is provided. The data processing system may comprise a processor and a memory coupled to the processor. The memory may contain instructions which, when executed by the processor, cause the processor to perform various ones, or combinations of, the operations outlined above with regard to the computer program product illustrative embodiment.

In yet another illustrative embodiment, a method for performing a remote mirroring operation between a production site system and a recovery site system is provided. The method may comprise establishing a physical session for a storage control unit associated with the production site system. The physical session may include a plurality of storage volume groups. The method may further comprise establishing a virtual session, within the physical session, for each of the storage volume groups. The remote mirroring operation may be selectively performed between the production site system and the recovery site system, with respect to one of the storage volume groups while other storage volume groups in the plurality of storage volume groups are not subjected to the remote mirroring operation. The method may further comprise various ones, or combinations of, the operations outlined above with regard to the computer program product illustrative embodiment.

In still another illustrative embodiment, a method of providing a data mirroring service is provided. The method may comprise providing one or more of a production site computing device or a recovery site computing device and providing data mirroring service application software on at least one of the one production site computing device or the recovery site computing device. The data mirroring service application software may establish a physical session for a storage control unit associated with the one or more production site computing devices. The physical session may include a plurality of storage volume groups.

The data mirroring service application software may further establish a virtual session, within the physical session, for each of the storage volume groups. The data mirroring service application software may also selectively perform a remote mirroring operation, between a production site computing device and a recovery site computing device, with respect to one of the storage volume groups while other storage volume groups in the plurality of storage volume groups are not subjected to the remote mirroring operation.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an example of a session policy file in accordance with one illustrative embodiment;

DETAILED DESCRIPTION OF THE PREFERRED EMBODIMENTS

The illustrative embodiments provide a mechanism for virtualizing a physical session in a remote mirroring system so that individual application volumes may undergo remote mirroring operations independently of the other application volumes in the physical session. The illustrative embodiments are preferably implemented with a remote mirroring system, such as Global Mirror™ available from International Business Machines, Inc. of Armonk, N.Y. As such, the illustrative embodiments are preferably implemented with a distributed data processing system in which application volumes at a production site are replicated to a remotely located recovery site. While the illustrative embodiments will be described in terms of use with the Global Mirror™ remote mirroring system, it should be appreciated that the illustrative embodiments are not limited to use with Global Mirror™ and may be utilized with any remote mirroring system that is currently known or may later be developed.

By "remotely located" what is meant is that the production site is topographically remotely located from the recovery site on one or more communication networks. A topographically remotely located recovery site is outside the storage area network (SAN) or server cluster of the production site. A topographically remotely located recovery site may be geographically remotely located as well as topographically remotely locate, but this is not required.

Figure 1:
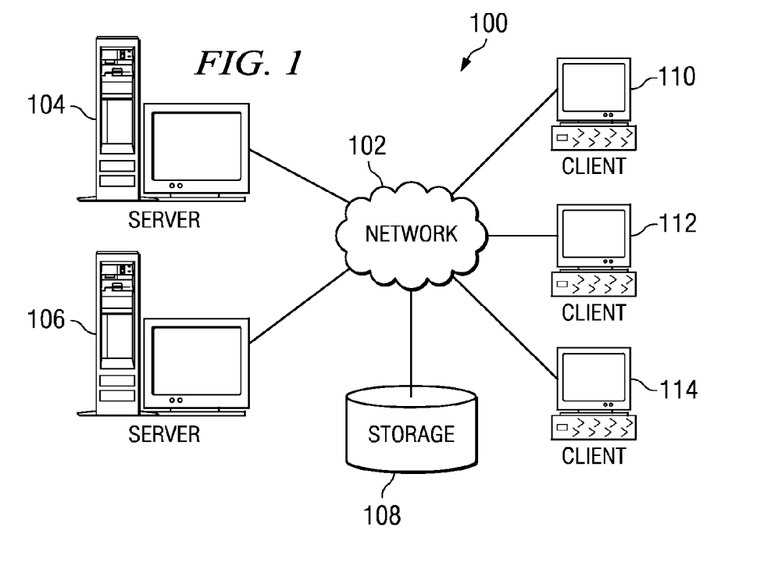
FIG. 1 is an exemplary diagram illustrating a distributed data processing environment in which exemplary aspects of the illustrative embodiments may be implemented.
Figure 2:
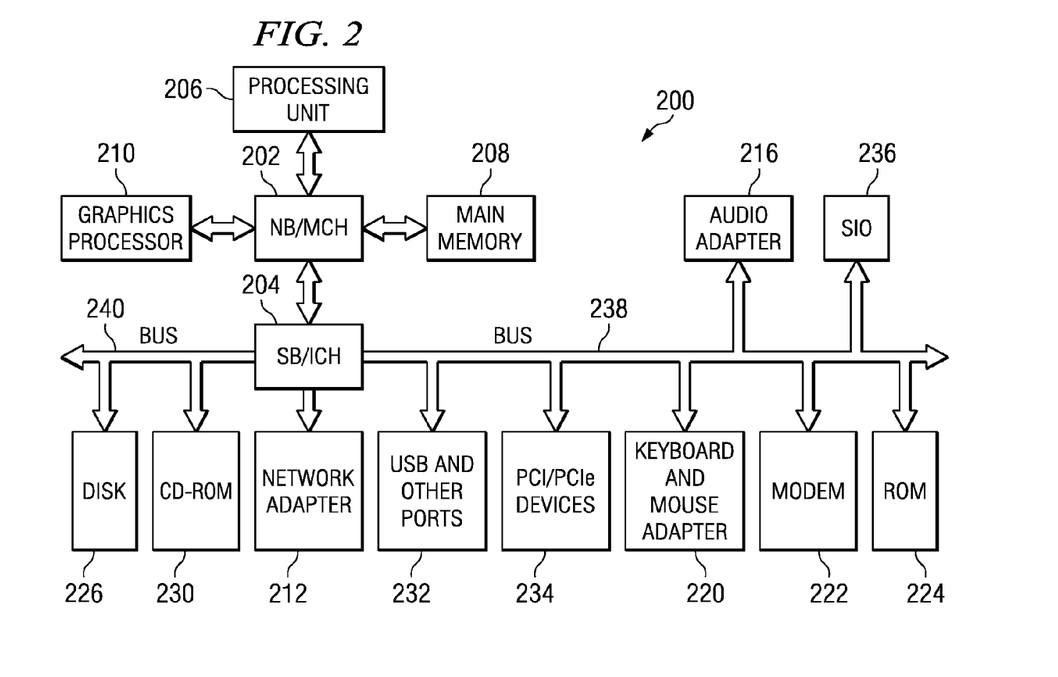
FIG. 2 is an exemplary block diagram of a data processing device in which exemplary aspects of the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In the context of the above illustrative distributed data processing system, with the illustrative embodiments, a first server or set of servers may provide one or more applications for an electronic business enterprise. The server(s) may have associated storage systems, having one or more storage control units, in which data corresponding to the applications are stored in various volumes of the storage systems. In addition to these servers, which provide a "production site" for the applications of the electronic business enterprise, a second server or set of servers is provided at a topologically, and possibly geographically, remotely located position in the one or more communication networks. These second servers may have an associated storage system to which application data may be stored as part of a remote mirroring operation. Thus, these second server(s) provide a "recovery site" for storing application data for failover and failback recovery of applications running at the production site.

Figure 3:
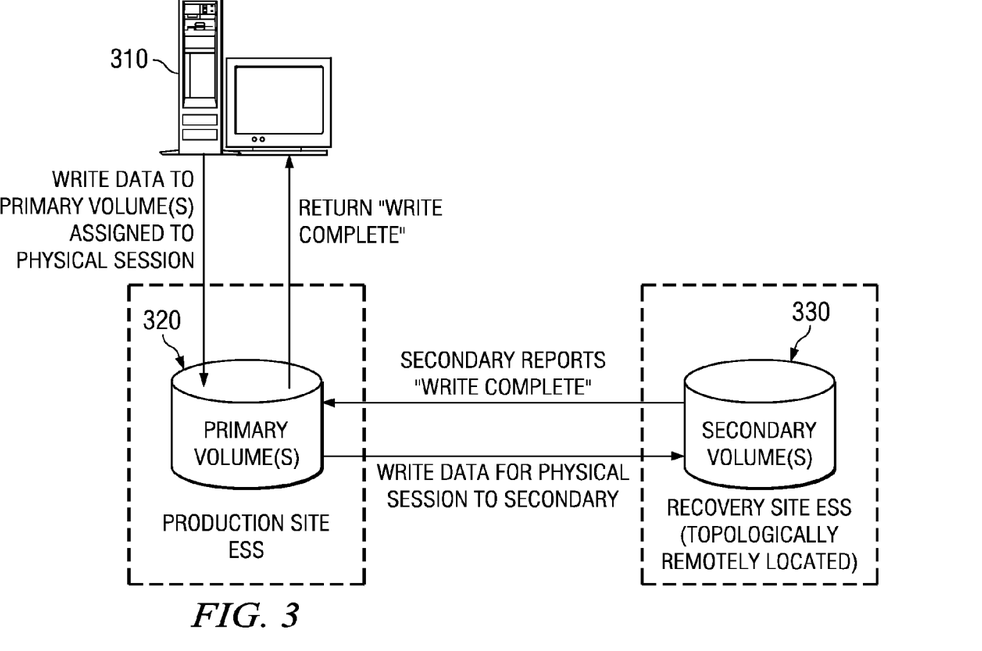
FIG. 3 is an exemplary diagram illustrating a remote mirroring operation in accordance with one illustrative embodiment.

Typically, in known remote mirroring operations, because a storage control unit can only have a single physical session, when the remote mirroring operation is to be performed, it is performed with regard to all of the volumes managed by the storage control volume. FIG. 3 is an exemplary diagram illustrating a remote mirroring operation in accordance with one illustrative embodiment. In the depicted example, the Global Mirror™ product, also referred to as PPRC-XD, is used to perform the remote mirroring operation, which in this case is a peer-to-peer remote copy operation. Global Mirror™ is an Enterprise Storage Server (ESS) function that allows the shadowing of application system data from one site (referred to as the production site) to a second site (referred to as the recovery site). The logical volumes that hold the data in the ESS at the production site are referred to as primary volumes and the corresponding logical volumes that hold the mirrored data at the recovery site are referred to as secondary volumes. In one illustrative embodiment, the connection between the production and the recovery site ESSs may be provided using Enterprise Systems Connection (ESCON) links.

FIG. 3 illustrates the sequence of a write operation when operating Global Mirror™ in synchronous mode (PPRC-SYNC). As shown in FIG. 3, in this synchronous type of operation, the updates done to the production site primary volumes 320 are synchronously shadowed onto the secondary volumes 330 at the recovery site. Because this is a synchronous solution, write updates are ensured on both copies (primary and secondary) before the write is considered to be completed for the application running on the computing device 310.

Because, in PPRC-SYNC operation, the application does not get the "write complete" condition until the update is synchronously done in both the primary and the secondary volumes 320 and 330, from the application perspective, the data at the recovery site secondary volumes 330 is real time data that is always consistent with the data at the primary volumes 320.

One implication of this characteristic is that, in normal PPRC-SYNC operation, dependent writes are applied on the secondary volumes 330 in the same sequence as they are applied in the primary volumes 320. This is very important from an application consistency perspective at the time of the recovery. PPRC-SYNC can provide continuous data consistency at the recovery site without needing to periodically interrupt the application to build consistency checkpoints. From the application perspective this is a non-disruptive way of always having valid data at the recovery location.

While a synchronous PPRC operation is illustrated in FIG. 3, it should be appreciated that the mechanisms of the illustrative embodiments may be equally applicable to both synchronous and asynchronous remote copy operations. In an asynchronous remote copy operation, the "write complete" may be returned from the primary volumes 320 prior to the data being committed in the secondary volumes 330.

As is evident from FIG. 3, with the known remote mirroring systems, such as are provided by the Global Mirror™ or PPRC-XD product, all of the application data and metadata associated with a physical session of a storage control unit must be the subject of the remote mirroring operation. There is no ability to select a subset of the application data and metadata, such as the data and metadata associated with a single application instance, and perform the remote mirroring operation with respect to that subset of application data and metadata.

The illustrative embodiments provide a mechanism for virtualizing a physical session into a plurality of virtual sessions that may be used to individually perform remote mirroring operations on selected application volumes. Thus, with the mechanism of the illustrative embodiments, remote mirroring operations, such as failover and failback operations, may be performed with regard to a first set of virtual sessions while other virtual sessions continue uninterrupted. Therefore, a user is provided with the flexibility to temporarily move, through a selective failover operation, selected application production workloads from production sites to recovery sites while other applications can run continuously at the production site. Later, those failed-over applications may failback to the production site and rejoin the physical session.

With the illustrative embodiments, while there is only one active physical session possible by design on each storage control unit, all of the volumes belonging to this physical session can be segregated into groups according to each individual application that the user wishes to control separately. In order to generate a virtual session group for each individual application, a session policy file is created that specifies the primary volumes, secondary volumes, FlashCopy® volumes, control path information, and session parameters for the groups. Virtual sessions require a distinct control path relationship between source and target volumes, i.e. production site volumes and recovery site volumes, and the session parameters are the same among all sessions. Through the session policy file these distinct control paths, the distinct groups, and other session parameters for the groups are specified.

FIG. 4 is an example of a session policy file in accordance with one illustrative embodiment. The example session policy file shown in FIG. 4 is provided in an Extensible Markup Language (XML) format, however the illustrative embodiments are not limited to such. Rather, the session policy file may be provide in any suitable format including other markup language formats and non-markup language formats, without departing from the spirit and scope of the present invention.

As shown in FIG. 4, a first portion 410 of the session policy file identifies the storage servers, e.g., "sharks" or enterprise storage systems (ESSs), which will be used in an asynchronous peer-to-peer remote copy (PPRC) operation. The PPRC operation is a remote mirroring operation that copies volumes of application data from a production site to a topologically remotely located recovery site. Global Mirror™ is one example of such a PPRC operation.

A second portion 420 of the session policy file identifies the control paths between the production site and recovery site that will be used to perform the remote mirroring operations. In the depicted example, two separate control paths are defined for each of the two distinct volume groups that are part of the physical session.

A third portion 430 of the session policy file identifies the session identifier and other parameters for the physical session, including the session identifier, consistency group interval, maximum consistency group drain time, maximum coordination timer, master storage unit, i.e. master lss, and the like. These session parameters in the third portion 430 apply to all of the volume groups specified in the session policy file.

The session identifier is the unique number which represents the physical session representing a collection of storage volumes that are managed together when creating consistent copies of volumes. This collection of storage volumes can reside in one or more logical storage subsystems (LSS) and one or more enterprise storage systems (ESSs) in a domain. A physical session must be opened for each LSS that participates in the PPRC environment. If a session is opened on an LSS, it means that volumes from that LSS may be added to the physical session.

The cginterval parameter is the time for forming the consistency groups in order to maintain the global consistency of the data. The maxdraintime parameter is the maximum consistency group drain time. The maxcoordinateinterval parameter is the maximum coordination timer. The master lss parameter is the LSS in the Master ESS that controls the other LSSs. The master is a term for a function inside an ESS that communicates with the subordinate ESSs to control the creation of consistency groups and manage the physical session. The master is defined when a start/resume physical session command is issued to an LSS in the master ESS.

In a fourth portion 440 of the session policy file, the volume groups for the physical session are specified. As shown in FIG. 4, two separate volume groups are identified as volume "relationships." These separate volume groups may be associated with different applications or application instances that are provided in the product site for a particular user or business entity, for example.

The individual session policy files, such as that shown in FIG. 4, may be parsed, such as by using an XML parser, and transformed into individual session data objects, each of which contains a connection object to a corresponding storage control unit, path connection objects, and volume objects which represent the physical storage devices associated with the storage control unit. Each volume group specified in the fourth portion 440 of the session policy file may be the basis for generating a separate session data object for a virtual session. A single unified supreme session object may also be provided which contains all virtual session data objects, i.e. "sub-session" objects. This supreme session object represents the real physical session for the storage control unit.

Figure 5:
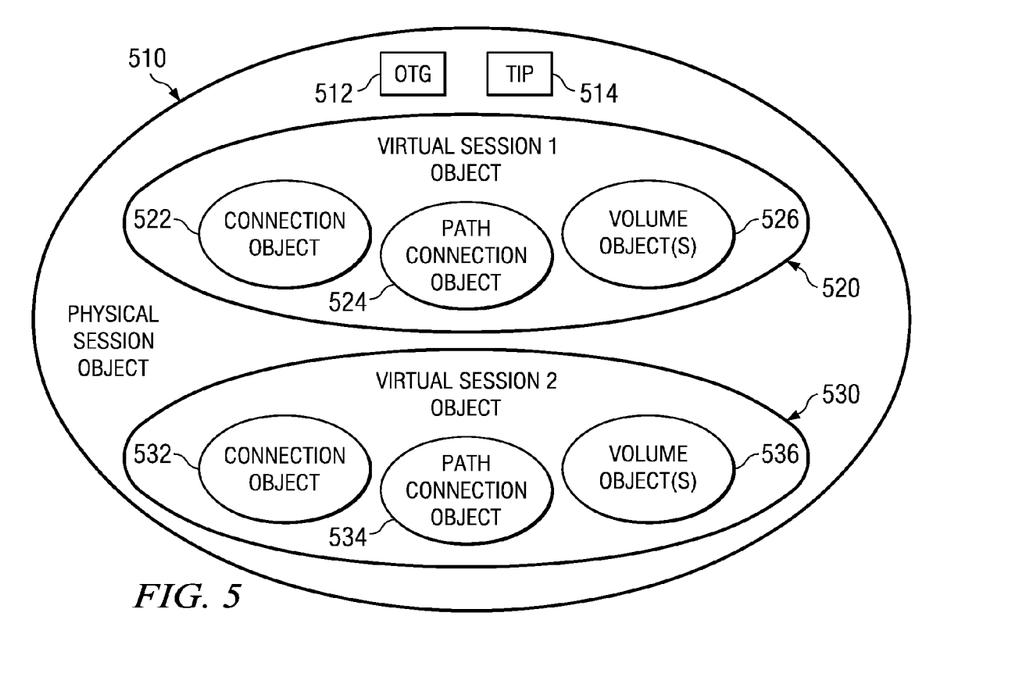
FIG. 5 is an exemplary diagram illustrating a relationship between objects generated based on a session policy file in accordance with one illustrative embodiment.

FIG. 5 is an exemplary diagram illustrating a relationship between objects generated based on a session policy file in accordance with one illustrative embodiment. As shown in FIG. 5, from the session policy file, a physical session object 510 is provided that represents the actual physical session of the storage control unit. The physical session object 510 contains the virtual session objects 520 and 530 that are generated from the volume group definitions in the session policy file. Each of these virtual session objects 520 and 530 have associated connection objects 522 and 532 for connecting to a particular storage control unit and path connection objects 524 and 534 generated based on the control path information for the volume groups specified in the session policy file. In addition, the virtual session objects 520 and 530 further have volume objects 526 and 536 for each of the volumes that are part of the virtual session.

The various objects shown in FIG. 5 are used by the mechanisms of the illustrative embodiments to control the performance of remote mirroring operations with regard to individual volume groups, e.g., individual applications or application instances. With these objects, an individual volume group may be the subject of a remote mirroring operation while other volume groups in the same physical session may remain unchanged. Thus, individual applications may be subject to remote mirroring operations while other applications at the production site are permitted to continue operating without interference from the remote mirroring operation.

With the objects shown in FIG. 5, the physical session object 510 includes an operation thread group (OTG) 512 and a task instruction pointer (TIP) 514. The individual threads in the OTG 512 have associated unique session identifiers (USIs) for differentiating between the virtual sessions. The OTG 512, TIP 514, and USIs are utilized by the mechanisms of the illustrative embodiments to coordinate the multiple virtual sessions within the same single physical session.

With the illustrative embodiments, for each remote mirroring operation, such as failover or failback of a particular virtual session, all virtual sessions will be operated on as threads belonging to the same single thread group, i.e. the OTG 512.

The task instruction pointer (TIP) 514 is a global pointer for the OTG 512. The TIP 514 is updated by individual threads after completion of their particular steps in a remote mirroring operation. In order to maintain the integrity and consistency of the physical session, it is important that no single thread is allowed to proceed until the overall TIP 514 is successfully updated by each thread in the OTG 512. Alternatively, if an update of the TIP 514 is not successful, every thread has to wait until such thread update of the TIP 514 succeeds or corrective actions are executed to correct the failed steps and the particular failed step of the particular thread is re-executed successfully. If a thread operation calls for "skipping" certain steps based on their unique session identifier (USI), that particular thread will update the TIP 514 as "success" in order for the OTG 512 to proceed to the next step.

Each thread in the OTG 512 is assigned a unique session identifier (USI) which is based on user selection of sessions to go through the failover or failback operation. The purpose of the USI is to allow each thread to carry out and respond differently on each step of the remote mirroring operation, e.g., determine whether or not to update or look for the TIP 514 to carry out their next steps.

Thus, the USI allows individual threads to perform separate actions on each step of a remote mirroring operation, such as a failover or failback operation. The TIP 514 is used to provide consistency between the various threads of the OTG 512 so that no thread is allowed to advance to a next action in a remote mirroring operation until all other threads in the OTG 512 are ready to advance to their own next action in the remote mirroring operation. Thus, the TIP 514 is responsible for maintaining the consistency of the physical session while the USI is responsible for allowing each thread to operate differently from other threads in the OTG 512. The combination of these two mechanisms and the policy objects, connection objects, and volume objects allows individual virtual sessions within a physical session of a storage control unit to undergo remote mirroring operations independently of other virtual sessions within the physical session. Hence, volumes associated with individual applications may undergo remote mirroring operations while other volumes associated with other individual applications may continue to operate without undergoing the remote mirroring operations.

Figure 6:
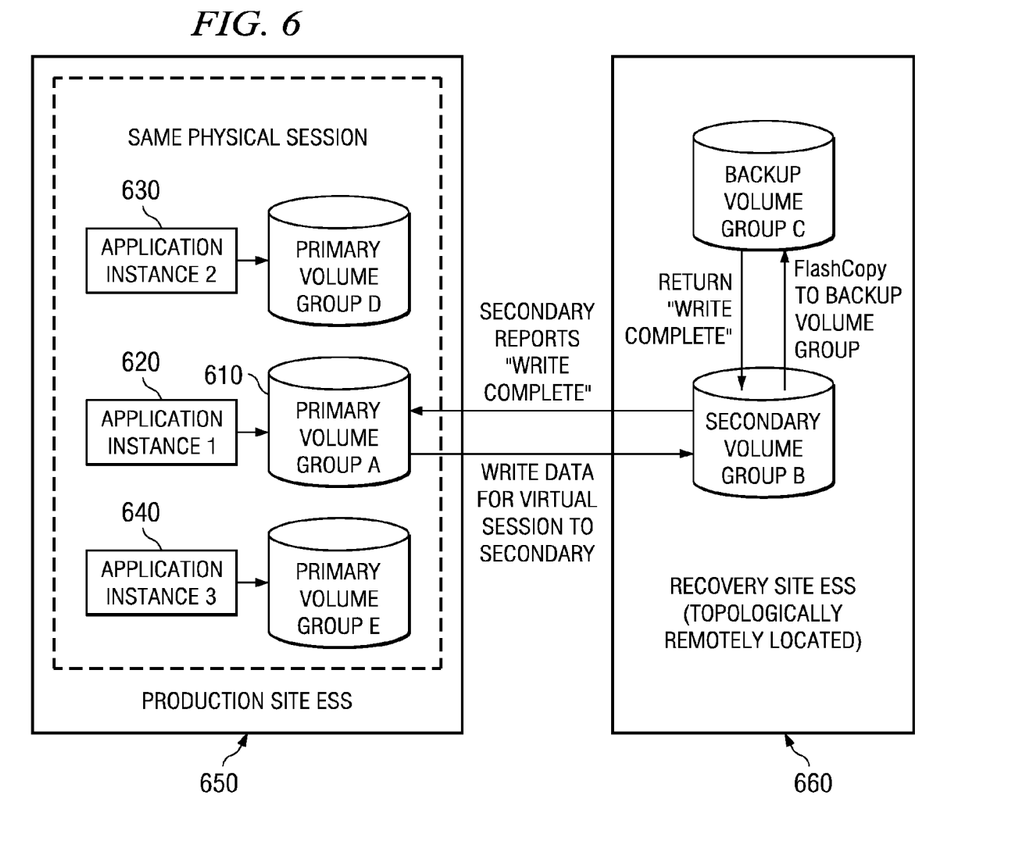
FIG. 6 is an exemplary diagram illustrating a mirroring operation in accordance with one illustrative embodiment.

FIG. 6 is an exemplary diagram illustrating a remote mirroring operation in accordance with one illustrative embodiment. As shown in FIG. 6, the remote mirroring operation of the illustrative embodiments allows volumes 610 associated with an individual application instance 620 to undergo a remote mirroring operation while other application instances 630 and 640 continue to operate in a normal fashion at the production site 650. For example, the volumes 610 associated with the application instance 620 may be the subject of a peer-to-peer remote copy (PPRC) operation between the production site 650 and the topologically, and optionally geographically, remotely located recovery site 660.

In contrast to the known remote mirroring operation shown in FIG. 3, the illustrative embodiments provide a mechanism for more fine grain application of remote mirroring operations. This fine grain application of remote mirroring operations is made possible via the virtualization and remote mirroring operation control mechanisms of the illustrative embodiments. The remote mirroring operation control mechanisms involve the use of the OTG, TIP, and USI to control the application of the remote mirroring operation to a single volume group while maintaining consistency between the volume groups during the remote mirroring operation, as described hereafter.

In general, when a storage server at the production site is to perform a remote mirroring operation, the remote mirroring operation is initiated in response to a schedule, a user input, or the like. The command to perform the remote mirroring operation is provided to the physical session object which causes the OTG to spawn threads for each of the virtual session objects maintained by the physical session object. Each thread is provided with a USI which is used by the OTG to manage the spawned threads. The TIP of the physical session object is initialized to an initial value. The TIP, for example, may contain a bit for each thread in the OTG and these bits may be set to an initial value.

Having initialized the mechanisms used to virtualize the physical session and initialized the control mechanisms of the various threads of the OTG, the physical session object is used to perform the remote mirroring operation. The steps performed in the remote mirroring operation are dependent upon the type of remote mirroring operation being performed.

For illustration purposes, a failover remote mirroring operation will be used as an example operation to illustrate the control mechanisms of the illustrative embodiments for controlling the various virtual sessions represented by different threads in the OTG.

Figure 7:
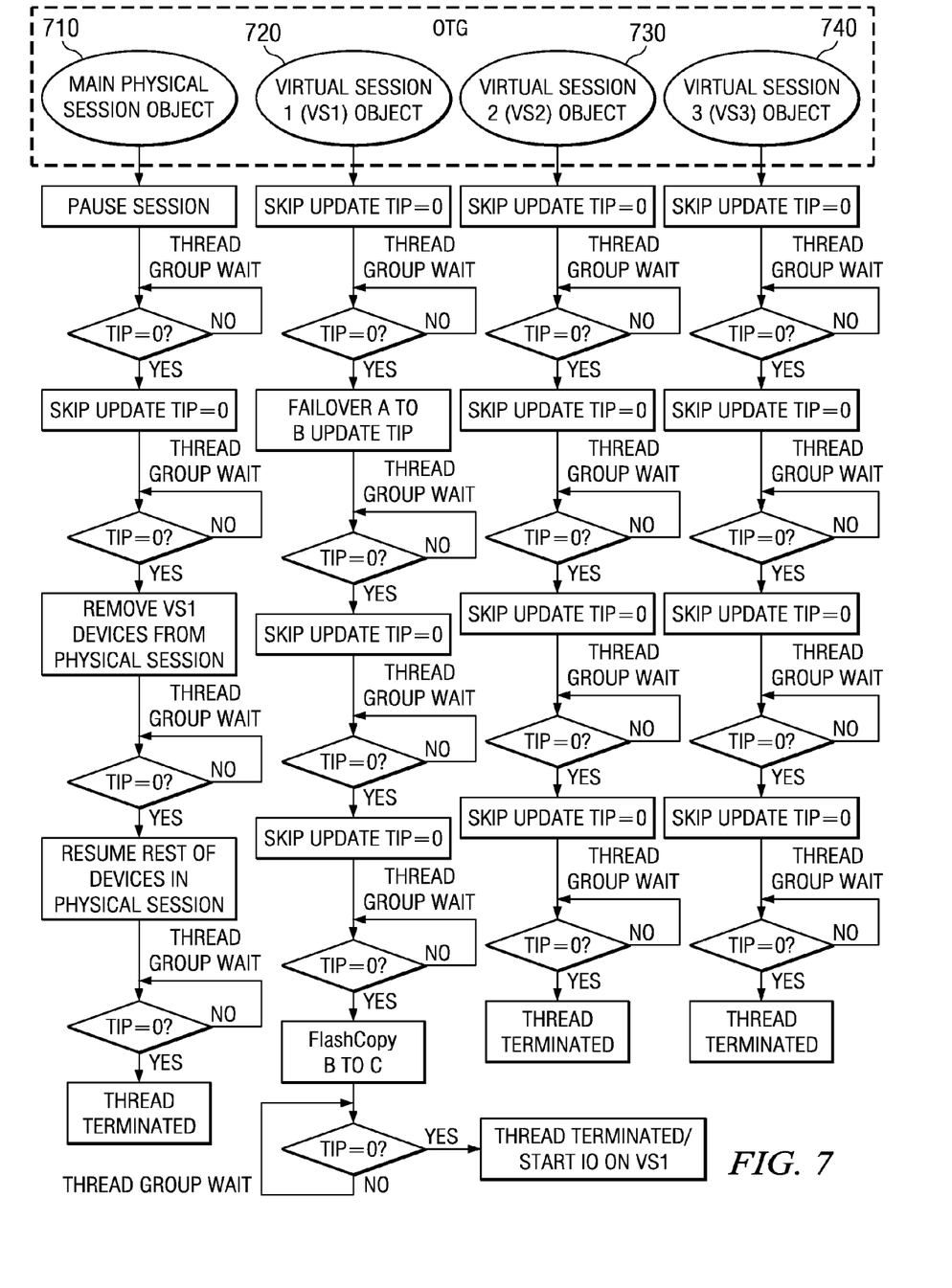
FIG. 7 is an exemplary diagram illustrating various steps of a failover operation for a virtual session in accordance with one illustrative embodiment.

FIG. 7 is an exemplary diagram illustrating various steps of a failover operation for a virtual session in accordance with one illustrative embodiment. It should be noted that in the failover operation, a master physical control unit, i.e. a storage server controller, is responsible for controlling the failover operation. The master physical control unit is specified for the global mirroring session as part of the session parameters. Other storage server controllers are subordinate to the master physical control unit for that global mirroring session.

In the failover operation, a first step of the failover operation is to pause the physical session so that all of the storage devices will finish forming their last consistency group. Thereafter, the volumes of the product site are "failed-over," e.g., remotely copied using a peer-to-peer remote copy operation, to the topologically remotely located recovery site. After the failover operation is performed, a FlashCopy of the failed-over volumes may be performed to thereby update a globally consistent copy of the failed-over volumes. This failover operation is modified by the illustrative embodiments, in the manner shown in FIG. 7, so that the failover is performed with regard to an individual volume group within the physical session.

As shown in FIG. 7, as part of the initialization of the threads in the OTG so as to perform the required failover operation, a first thread 710 is generated that is a main session thread that is used to control the overall remote mirroring operation with regard to the physical session. Additional threads are spawned for each of the other virtual sessions including a second thread 720 that is provided for a first virtual session object, a third thread 730 that is provided for a second virtual session object, and a fourth thread 740 that is provided for a third virtual session object. Each of these threads is part of the OTG and has its own unique USI that is used by the OTG to cause different operations to be performed by the different threads 710-740.

In the depicted example, a failover operation is to be performed between a first volume group A, associated with a first virtual session, to a second volume group B at the topologically remotely located recovery site. Meanwhile, the other volume groups associated with the other virtual sessions are not subjected to the failover operation.

As shown in FIG. 7, the main session thread 710 is first used to perform the pause operation for pausing the physical session so that all of the storage devices will finish forming their last consistency group. Once the pause operation is completed successfully, the TIP bit associated with the main session thread 710 is set to a designated value, e.g., 0.

As mentioned above, in order to ensure consistency between the virtual sessions, each thread must update their associated TIP bit to a designated value, e.g., 0, before the overall remote mirroring operation may progress to the next step. Thus, each of the other threads 720-740 perform a skip operation in which only the TIP bit associated with the thread is set to successfully complete value.

In each thread 710-740, a determination is made as to whether the TIP bit values are all set to a successfully complete value. Only when the TIP bit values are updated to be successfully complete will each of the threads 710-740 be allowed to progress to a next stage. If the TIP bit values are not all set to a successfully complete value, then the threads 710-740 enter into a wait operation in which the threads wait until the TIP bit values are updated to a successfully complete value. Once all of the TIP bit values indicate successful completion, the remote mirroring operation is permitted to continue to a next stage and the TIP bit values are reset to their initial value.

In a next stage of the failover operation, after all of the threads 710-740 indicate a successful completion by updating the TIP bit values, a failover operation is performed using the second thread 720 associated with the first virtual session object. This failover operation performs a peer-to-peer remote copy operation from the first volume group A at the production site to the second volume group B at the topologically remotely located recovery site. After successful completion of the failover operation, the second thread 720 updates the corresponding TIP bit value indicating that the failover operation completed successfully.

The other threads 710 and 730-740 perform skip operations and update their corresponding TIP bit values to indicate a successful completion. Again, a determination is made, in each of the threads 710-740, as to whether the TIP bit values indicate successful completion of the operations in each of the threads 710-740. If so, then the failover operation may progress to the next step, otherwise, the threads enter a waiting operation until successful completion is indicated by all of the threads.

In a third stage of the failover operation, the main session thread 710 removes the virtual session (VS1) associated with the second thread 720 from the physical session. This removal is done because once VS1 is failed-over, the rest of the virtual sessions will resume global mirror operations (after the initial pause for the whole physical session. To remove the VS1 session, the VS1 related session objects (volumes, connections, paths, etc.) are removed from the main physical session, so the physical session will continue global mirror operations with VS1 contents.

While the removal of VS1 is being performed, the other threads 720-740 perform skip operations as in previous steps of the failover operation. Thereafter, the main session thread 710 resumes the application instances associated with the other virtual sessions 730-740 that remain part of the physical session. The other threads 720-740 perform skip operations. The main session thread 710 and virtual session threads 730-740 then terminate.

The thread 720 associated with the virtual session that is the subject of the failover operation continues on with a FlashCopy operation being performed between volume group B and a FlashCopy volume group C. The second thread 720 then either terminates or starts I/O operations on the volumes associated with the virtual session associated with the second thread 720.

In the above sequence of operations, the OTG uses the USI of the various threads 710-740 to dispatch instructions for performing the various operations mentioned above. Since the failover operation is to be performed with regard to the storage volume group A associated with the virtual session (VS1), the failover and FlashCopy instructions will be dispatched to the second thread 720 using the USI associated with this thread 720. Similarly, instructions associated with the control of the failover operation are issued to the first thread 710 using its associated USI that performs the operations required to set up the OTG for the failover operation and to resume the application instances associated with the storage volume groups associated with the other virtual sessions. The other threads, that are not part of the failover operation, are issued skip instructions, based on their USI, for basically causing these threads to not perform any action.

Thus, from the above, it can be seen that the storage volume groups associated with virtual session 2 (VS2) and virtual session 3 (VS3) are not failed-over but the storage volume group associated with virtual session 1 (VS1) is failed-over to the topologically remotely located recovery site, i.e. storage volume group B with a FlashCopy to storage volume group C. Therefore, using the mechanisms of the illustrative embodiments, one set of storage volumes in a physical session of a storage control unit may be the subject of a remote mirroring operation while others in the physical session are not.

Figure 8:
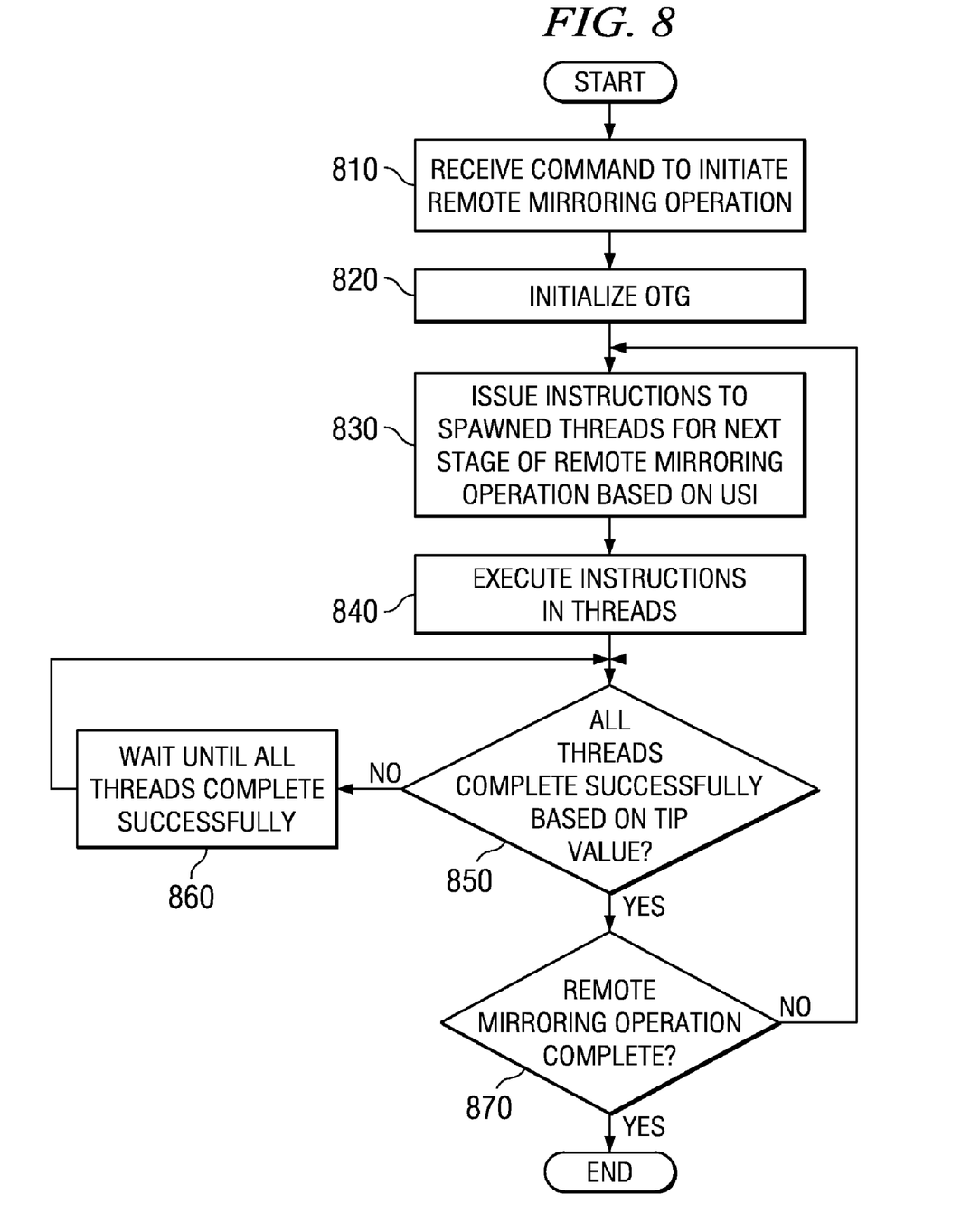
FIG. 8 is a flowchart outlining an exemplary failover operation in accordance with an illustrative embodiment.

FIG. 8 is a flowchart outlining an exemplary failover operation in accordance with an illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 8, the operation starts by receiving a command to initiate a remote mirroring operation (step 810). In response to the remote mirroring operation command, the OTG is initialized (step 820). As described previously, this initialization may involve the spawning of threads for each of the virtual sessions as well as a main session thread for coordinating and controlling the remote mirroring operation. This initialization may further comprise assigning a USI to each of the threads and setting the TIP bit values to their initial value.

Instructions associated with a next stage of the remote mirroring operation are dispatched to each of the spawned threads (step 830). The threads execute the dispatched instructions for the current step of the remote mirroring operation (step 840). A determination is made as to whether all of the threads have indicated successful completion of their respective instructions (step 850). If not, the operation waits (step 860) until all of the threads indicate successful completion.

If all of the threads indicate successful completion, then a determination is made as to whether the remote mirroring operation has completed (step 870). If not, the operation returns to step 830 where instructions for the next stage of the remote mirroring operation are dispatched. If the remote mirroring operation has completed, then the operation terminates.

It should be noted that while FIGS. 7 and 8 above are directed to the performance of a failover operation, a similar operation may be performed with regard to failback operations. In a failback operation, when a physical storage volume is made available, after a failover operation, for example, an administrator, via an administrator workstation, may initiate a failback operation by submitting a failback command to the production site system. A peer-to-peer remote copy path may be re-established between the production site and the recovery site with a virtual session for the application instance being created. Thereafter, the data stored in the recovery site volume for the application instance may be failed-back, using the established virtual session, to the production site volumes and the application instance resumed on the production site system. Such failback may be performed independently of the other virtual sessions that are part of the physical sessions such that the other virtual sessions may continue to operate in a normal functional mode.

Thus, the illustrative embodiments provide a mechanism by which individual volume groups within a physical session of a storage control unit may be subjected to a remote mirroring operation. Therefore, as opposed to known remote mirroring operations, the illustrative embodiments, through virtualization of the physical session of the storage control unit, provide a finer grain selection of data and metadata to be mirrored between a production site and a recovery site while allowing application instances whose data and metadata are not part of the mirroring operation to continue operation.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium tangibly embodying a computer readable program, wherein the computer readable program, when executed on a computing device, causes the computing device to:

establish a physical session for a storage control unit associated with the computing device, wherein the physical session includes a plurality of storage volume groups;

establish a virtual session, within the physical session, for each of the plurality of storage volume groups thereby forming a plurality of virtual sessions;

receive a request to mirror one or more virtual sessions in the plurality of virtual sessions;

spawn a thread for each virtual session in the plurality of virtual sessions;

assign a unique session identifier to each thread, wherein the unique session identifier indicates either mirroring of the virtual session or not to mirror the virtual session;

selectively perform a remote mirroring operation, between the computing device and a second computing device, with respect to one or more of the storage volume groups in the plurality of storage volume groups based on whether the one or more storage volume groups has an associated virtual session with an associated thread that has an associated unique session identifier indicating the mirroring of the virtual session while other storage volume groups in the plurality of storage volume groups are not subjected to the remote mirroring operation based on whether the other storage volume groups has an associated virtual session with an associated thread that has an associated unique session identifier indicating not to mirror the virtual session; and update a task instruction pointer (TIP) by each thread after completion of the corresponding thread's operations in the remote mirroring operation, wherein a thread that has the associated unique session identifier indicating the mirroring of the virtual session updates the TIP when the remote mirroring operation is complete and wherein the thread that has the associated unique session identifier indicating not to mirror the virtual session updates the TIP without performing any remote mirroring operation.

2. The computer program product of claim 1, wherein the remote mirroring operation comprises:

a peer-to-peer remote copy operation of application data in a first storage volume associated with an application instance running on the computing device to a second storage volume of a storage system associated with the second computing device.

3. The computer program product of claim 1, wherein the computer readable program further causes the computing device to:

receive a session policy file, wherein the session policy file comprises parameters identifying the physical session and the storage volume groups; and generate virtual session objects for each of the storage volume groups to thereby establish a virtual session for each of the storage volume groups.

4. The computer program product of claim 3, wherein the virtual session objects comprise a connection object for connecting to a particular storage control unit, a path connection object generated based on the control path information for the volume groups specified in the session policy file, and a volume object for each of the volumes that are part of the virtual session as specified in the session policy file.

5. The computer program product of claim 3, wherein the computer readable program further causes the computing device to:

generate a physical session object based on the session policy file, wherein the physical session object comprises the virtual session objects, an operation thread group (OTG) and the task instruction pointer (TIP).

6. The computer program product of claim 5, wherein the OTG is comprised of a plurality of threads, one thread for each virtual session object and a master thread for the physical session object, and wherein each thread has a unique session identifier for differentiating between the virtual sessions and the physical session.

7. The computer program product of claim 6, wherein the computer readable program further causes the computing device to:

prevent continuation of execution of threads in the OTG to a next operation until all threads in the OTG have updated the TIP to indicate successful completion of their current operation.

8. The computer program product of claim 6, wherein the remote mirroring operation is a failover operation, and wherein:
   a physical session thread in the plurality of threads of the OTG pauses the physical session;
   a first virtual session thread in the plurality of threads of the OTG initiates a failover from a storage volume group associated with the first virtual session thread to a storage volume group associated with the second computing device;
   the physical session thread removes the storage volume group associated with the first virtual session thread from the physical session object and resumes operation of other storage volume groups of other virtual sessions associated with the physical session.

9. The computer program product of claim 1, wherein the remote mirroring operation is one of a failover operation or a failback operation.

10. The computer program product of claim 1, wherein the computing device and second computing device are topologically remotely located from one another.

11. The computer program product of claim 1, wherein the computing device and second computing device are geographically remotely located from one another.

12. A data processing system for performing a remote mirroring operation between the data processing system and another data processing system, comprising:
   a processor; and
   a memory coupled to the processor, wherein the memory contains instructions which, when executed by the processor, cause the processor to:
   establish a physical session for a storage control unit associated with the computing device, wherein the physical session includes a plurality of storage volume groups;
   establish a virtual session, within the physical session, for each of the plurality of storage volume groups thereby forming a plurality of virtual sessions;
   receive a request to mirror one or more virtual sessions in the plurality of virtual sessions;
   spawn a thread for each virtual session in the plurality of virtual sessions;
   assign unique session identifier to each thread, wherein the unique session identifier indicates either mirroring of the virtual session or not to mirror the virtual session;
   selectively perform a remote mirroring operation, between the computing device and a second computing device, with respect to one or more of the storage volume groups in the plurality of storage volume groups based on whether the one or more storage volume groups has an associated virtual session with an associated thread that has an associated unique session identifier indicating the mirroring of the virtual session while other storage volume groups in the plurality of storage volume groups are not subjected to the remote mirroring operation based on whether the other storage volume groups has an associated virtual session with an associated thread that has an associated unique session identifier indicating not to mirror the virtual session; and
   update a task instruction pointer (TIP) by each thread after completion of the corresponding thread's operations in the remote mirroring operation, wherein a thread that has the associated unique session identifier indicating the mirroring of the virtual session updates the TIP when the remote mirroring operation is complete and wherein the thread that has the associated unique session identifier indicating not to mirror the virtual session updates the TIP without performing any remote mirroring operation.

13. The system of claim 12, wherein the remote mirroring operation comprises:
   a peer-to-peer remote copy operation of application data in a first storage volume associated with an application instance running on the data processing system to a second storage volume of a storage system associated with the other data processing system.

14. The system of claim 12, wherein the instructions further cause the processor to:
   receive a session policy file, wherein the session policy file comprises parameters identifying the physical session and the storage volume groups; and
generate virtual session objects for each of the storage volume groups to thereby establish a virtual session for each of the storage volume groups.

15. The system of claim 14, wherein the virtual session objects comprise a connection object for connecting to a particular storage control unit, a path connection object generated based on the control path information for the volume groups specified in the session policy file, and a volume object for each of the volumes that are part of the virtual session as specified in the session policy file.

16. The system of claim 14, wherein the instructions further cause the processor to:
   generate a physical session object based on the session policy file, wherein the physical session object comprises the virtual session objects, an operation thread group (OTG) and the task instruction pointer (TIP).

17. The system of claim 16, wherein the OTG is comprised of a plurality of threads, one thread for each virtual session object and a master thread for the physical session object, and wherein each thread has a unique session identifier for differentiating between the virtual sessions and the physical session.

18. The system of claim 17, wherein the instructions further cause the processor to:
   prevent continuation of execution of threads in the OTG to a next operation until all threads in the OTG have updated the TIP to indicate successful completion of their current operation.

19. The system of claim 17, wherein the remote mirroring operation is a failover operation, and wherein:
   a physical session thread in the plurality of threads of the OTG pauses the physical session;
   a first virtual session thread in the plurality of threads of the OTG initiates a failover from a storage volume group associated with the first virtual session thread to a storage volume group associated with the second computing device;
   the physical session thread removes the storage volume group associated with the first virtual session thread from the physical session object and resumes operation of other storage volume groups of other virtual sessions associated with the physical session.

20. The system of claim 12, wherein the remote mirroring operation is one of a failover operation or a failback operation.

21. The system of claim 12, wherein the computing device and second computing device are topologically remotely located from one another.

22. The system of claim 12, wherein the computing device and second computing device are geographically remotely located from one another.

23. A method for performing a remote mirroring operation between a production site system and a recovery site system, comprising:
   establishing a physical session for a storage control unit associated with the production site system, wherein the physical session includes a plurality of storage volume groups;
   establishing a virtual session, within the physical session, for each of the plurality of storage volume groups thereby forming a plurality of virtual sessions;
   receiving a request to mirror one or more virtual sessions in the plurality of virtual sessions;
   spawning a thread for each virtual session in the plurality of virtual sessions;
   assigning a unique session identifier to each thread, wherein the unique session identifier indicates either mirroring of the virtual session or not to mirror the virtual sessions;
   selectively performing a remote mirroring operation, between the computing device and a second computing device, with respect to one or more of the storage volume groups in the plurality of storage volume groups based on whether the one or more storage volume groups has an associated virtual session with an associated thread that has an associated unique session identifier indicating the mirroring of the virtual session while other storage volume groups in the plurality of storage volume groups are not subjected to the remote mirroring operation based on whether the other storage volume groups has an associated virtual session with an associated thread that has an associated unique session identifier indicating not to mirror the virtual session; and
   updating a task instruction pointer (TIP) by each thread after completion of the corresponding thread's operations in the remote mirroring operation, wherein a thread that has the associated unique session identifier indicating the mirroring of the virtual session updates the TIP when the remote mirroring operation is complete and wherein the thread that has the associated unique session identifier indicating not to mirror the virtual session updates the TIP without performing an remote mirroring operation.

24. The method of claim 23, wherein the remote mirroring operation comprises:
   a peer-to-peer remote copy operation of application data in a first storage volume associated with an application instance running on the computing device to a second storage volume of a storage system associated with the second computing device.

25. The method of claim 23, further comprising:
   receiving a session policy file, wherein the session policy file comprises parameters identifying the physical session and the storage volume groups; and
   generating virtual session objects for each of the storage volume groups to thereby establish a virtual session for each of the storage volume groups.

26. The method of claim 25, further comprising:
   generating a physical session object based on the session policy file, wherein the physical session object comprises the virtual session objects, an operation thread group (OTG) and the task instruction pointer (TIP).

27. The method of claim 26, wherein the OTG is comprised of a plurality of threads, one thread for each virtual session object and a master thread for the physical session object, and wherein each thread has a unique session identifier for differentiating between the virtual sessions and the physical session.

28. The method of claim 27, further comprising:
   prevent continuation of execution of threads in the OTG to a next operation until all threads in the OTG have updated the TIP to indicate successful completion of their current operation.

29. A method of providing a data mirroring service, comprising:
   providing one or more of a production site computing device or a recovery site computing device; and
   providing a data mirroring service application software on at least one of the one production site computing device or the recovery site computing device, wherein the data mirroring service application software:
      establishes a physical session for a storage control unit associated with the one or more production site computing devices, wherein the physical session includes a plurality of storage volume groups;
      establishes a virtual session, within the physical session, for each of the plurality of storage volume groups thereby forming a plurality of virtual sessions;
      receives a request to mirror one or more virtual sessions in the plurality of virtual sessions;
      spawns a thread for each virtual session in the plurality of virtual sessions;
      assigns a unique session identifier to each thread, wherein the unique session identifier indicates either mirroring of the virtual session or not to mirror the virtual session;
      selectively performs a remote mirroring operation, between the computing device and a second computing device, with respect to one or more of the storage volume groups in the plurality of storage volume groups based on whether the one or more storage volume groups has an associated virtual session with an associated thread that has an associated unique session identifier indicating the mirroring of the virtual session while other storage volume groups in the plurality of storage volume groups are not subjected to the remote mirroring operation based on whether the other storage volume groups has an associated virtual session with an associated thread that has an associated unique session identifier indicating not to mirror the virtual session; and
      updates a task instruction pointer (TIP) by each thread after completion of the corresponding thread's operations in the remote mirroring operation. wherein a thread that has the associated unique session identifier indicating the mirroring of the virtual session updates the TIP when the remote mirroring operation is complete and wherein the thread that has the associated unique session identifier indicating not to mirror the virtual session updates the TIP without performing any remote mirroring operation.

* * * * *